March 8, 1960   R. G. CORWIN ET AL   2,927,626
INSULATING BLANKET FOR CONCRETE
Filed Feb. 3, 1958
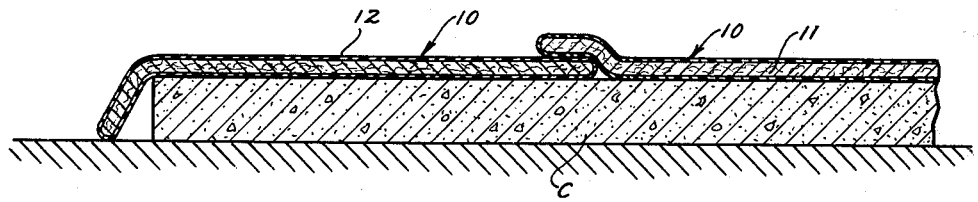
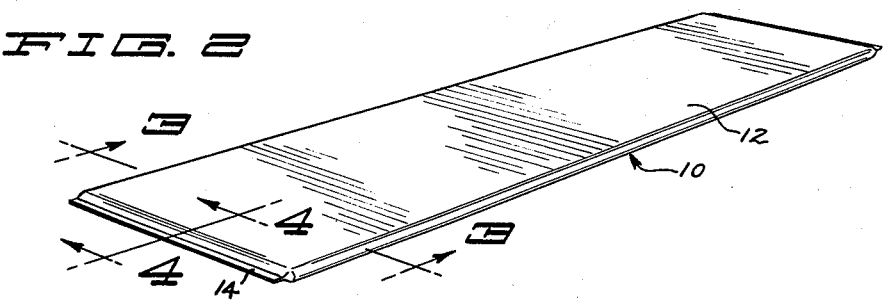
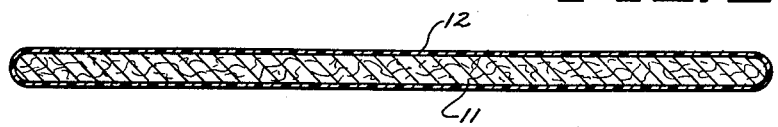
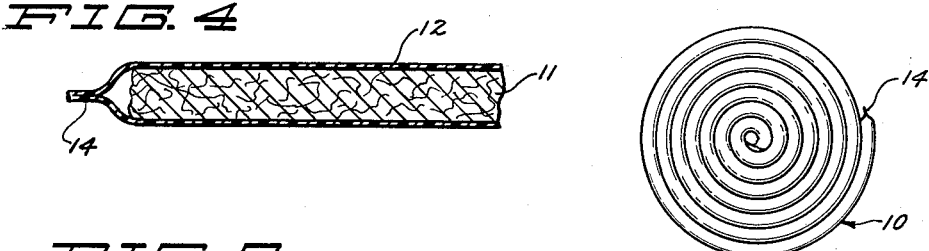
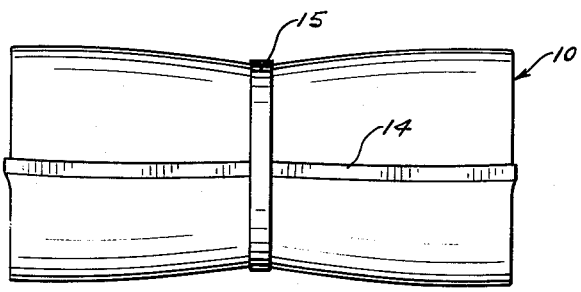
INVENTOR.
ROBERT G. BENNETT
BY ROBERT G. CORWIN
ATTORNEYS United States Patent Office 2,927,626
Patented Mar. 8, 1960

2,927,626

INSULATING BLANKET FOR CONCRETE

Robert G. Corwin and Robert G. Bennett, Minneapolis, Minn.

Application February 3, 1958, Serial No. 712,949

2 Claims. (Cl. 154—28)

This invention relates generally to the treatment of poured concrete and more particularly concerns a means for protecting such concrete from the effects of extreme temperatures during the curing period.

In the pouring of concrete slabs, walls or columns during sub-freezing temperatures it is extremely important for ultimate durability and maximum strength of the concrete body that it be protected from freezing during the first few days after pouring. The exact period of protection necessary is dependent upon the body or slab thickness, the atmospheric mean temperature and the concrete mixture involved. Moreover, it is important that the protective means used be such as to retain the moisture in the concrete in order that it cure properly.

Recommended practices for curing concrete call for maintaining the temperature at approximately 70° Fahrenheit for three days or 50° Fahrenheit for six days to give maximum strength to the body. Even where a calcium chloride or other hardening agent is used it is necessary to maintain the concrete well above freezing for at least five or six days after pouring.

It is common to use a raised heated enclosure over and around the slab or wall to maintain the desired temperature during sub-freezing conditions. However, this practice is undesirable for many reasons. The shelter must be strong and windproof and requires considerable effort and inconvenience to erect. Fire prevention rules must be observed, as it is necessary to supply artificial heat to the enclosure. The concrete or certain sections thereof are frequently damaged by the fire as there is also a maximum temperature for satisfactory curing. Furthermore, and perhaps the greatest drawback to this method is the fact that it allows and actually hastens the loss in concrete moisture content requiring water curing for proper hardening.

Similarly straw and other insulating materials such as bat insulation, insulating board, sawdust and the like have been used with the result that when the concrete slab or other body is kept sufficiently warm the slab dries out prematurely due to rapid evaporation. Furthermore, such insulating materials are not only absorptive but deteriorate quite rapidly under subjection to the weather elements limiting re-use.

The principal object of the present invention is to provide a concrete insulating blanket which has such insulating qualities as to retain the heat in a body of newly poured concrete for an extended period of time despite sub-freezing weather conditions and which at the same time is non-moisture absorbing so as to retain the moisture in the concrete to assure proper curing.

Another object of the invention is to provide a new and improved concrete insulating blanket having an insulating material enveloped by an air tight covering enabling air trapped within the covering to enhance the insulating quality of the blanket.

Still another object of the invention is to provide a new and improved insulating blanket for a section of newly poured concrete which will protect the section against freezing in sub-zero temperatures and yet which remains pliable and will not adhere to the concrete at such temperatures.

Still another object of the invention is to provide a concrete insulating blanket which is extremely light in weight for relatively simple application and transportation and yet which is resistant to deterioration enabling the blanket to be re-used a great number of times.

Still another object of the invention is to provide a new and improved method of manufacturing a concrete insulating blanket having a sheet of insulating material sealed in an outer covering.

With these and other objects in mind the invention broadly comprises a concrete insulating blanket formed of an elongated sheet of glass fiber material having a constant width and thickness throughout its length, the said sheet being enclosed in a covering of waterproof, air tight, pliable sheeting which is adapted to remain pliable without cracking at sub-zero temperatures enabling the blanket to be tightly rolled up at such temperatures for transportation or storage and said sheeting being formed in seamless tubes adapted to transversely and snugly encircle the glass fiber material with the tube ends projecting beyond the said material and being sealed rendering the covering air tight.

The above mentioned and still additional objects of the invention will be brought to light during the course of the following specification, reference being made to the accompanying drawing, in which—

Fig. 1 is a vertical section taken through a newly poured concrete slab and showing two of our improved insulating blankets arranged in partially overlapping slab covering position.

Fig. 2 is a perspective view of the blanket in unrolled condition.

Fig. 3 is a transverse section through the blanket taken on line 3—3 of Fig. 2 showing the snug fit of the covering around the insulating material.

Fig. 4 is an enlarged detail longitudinal section through one end portion of the blanket taken along line 4—4 of Fig. 2.

Fig. 5 is a side elevation of the blanket in rolled and bound condition ready for transportation or storage.

Fig. 6 is an end view of the blanket in its rolled condition.

Referring now more particularly to the drawing reference numerals will be used to denote like parts or structural features in the different views. In Fig. 1 a newly poured slab C of concrete is shown with the improved covering arranged over the slab in insulating position. The covering is formed of individual blankets 10 which are laid over the slab C in partially overlapping position to completely insulate the slab from outside weather conditions.

Each blanket comprises a sheet of insulating material 11 which is completely covered by an air tight waterproof pliable sheeting denoted at 12. The insulating material has a one to three inch overall uniform thickness and is preferably cut in widths of four to eight feet for convenience of handling. Glass fiber material is found to be most satisfactory as the insulating material in this application. This is due to its relatively low cost, its high insulating quality, its flexibility, and the fact that the material will not absorb moisture as is characteristic of certain other fibrous insulation materials. In addition glass fiber is relatively light simplifying manual laying and transporting of the blanket.

The blanket outer covering 12 is preferably formed of polyethylene. This material is extremely satisfactory inasmuch as it is waterproof, air tight and remains pliable without cracking in temperatures as low as minus 35° Fahrenheit.

In making the blanket polyethylene tubing is used having a diameter sufficient to rather snugly receive the insulation 11 in a flat condition as best shown in Fig. 3. As exemplary where the insulation is four feet wide and two inches thick a tube having a circumference of approximately eight feet four inches is used. The insulation 11 is then inserted endwise into the tubing giving the insulation peripheral protection. One end of the tube is then sealed together as at 14. The blanket is then rolled up with the sealed end inside exhausting surplus air from the open end and that end is then sealed in the same manner so that the covering completely envelopes the insulation.

The blanket may be so formed of any desirable length. It is found, however, that the length should preferably be limited to a convenient size and weight for manual transportation. The materials used enable the blanket to be rolled up in a convenient bundle as shown in Figs. 5 and 6 in which condition the roll may be secured against unwinding by a strap 15.

The blanket disclosed is extremely light in weight due to the minimal weight of the materials used. Glass fiber is extremely porous enabling a considerable quantity of air to be trapped within the outer covering and enhance the insulating quality of the blanket. The non-moisture absorptive character of glass fiber is also of considerable importance in this application of the material. This characteristic becomes of importance in the event that the outer covering material 12 becomes torn leaving the moist concrete exposed to the material 11.

When used as shown in Fig. 1 the blanket or blankets will not only retain the slab C at above the required temperature for proper setting despite sub-zero weather conditions but it will also prevent evaporation of moisture from the slab so that the concrete will cure properly. Obviously the required thickness of the insulation will vary with the severity of winds and temperature. It is found, however, that the three inch thickness affords sufficient protection under the most adverse conditions normally encountered in the United States.

While the blanket has herein been described and shown as being used in connection with a horizontal slab it will be understood that it can be used with equal effectiveness to protect vertical concrete columns, walls or the like.

The blanket is relatively inexpensive to manufacture, is light in weight, and is of such durability as to allow its repeated re-use. The tube type covering disclosed minimizes the heat sealing necessary to assure air tightness and provides a strong overall protection for the insulation material.

We have thus disclosed a concrete insulating blanket which economically and effectively carries out the aforementioned objectives. It is understood that suitable modifications may be made in the structure as disclosed, provided such modifications come within the spirit and scope of the appended claims. Having now therefore fully illustrated and described our invention, what we claim to be new and desire to protect by Letters Patent is:

1. The method of manufacturing a curing blanket for concrete which comprises inserting a flat elongated section of fibrous insulating material endwise into a tube of waterproof, air tight, pliable covering material so that the covering fits relatively snugly in a transverse direction around the section with end portions of the tube extending beyond the ends of the section, then closing one end portion of the tube with an air tight seal, then rolling the section with its covering lengthwise in a spiral roll with the closed end of the tube inside to expel excess air from the tube, then closing with an air tight seal the other end portion of the tube.

2. The method of manufacturing an insulation blanket having an elongated section of fibrous material enveloped in an air tight pliable covering which comprises placing the covering on the section so as to extend snugly and continuously around the section transversely throughout the length thereof with the end portions of the covering extending beyond the ends of the section and opening endwise, then sealing one end portion of the covering transversely leaving the other end portion open, then tightly rolling the section with its covering endwise in a spiral roll starting at the end thereof having said sealed end portion of the covering so as to force the major portion of the air within the covering out through said open other end portion, then sealing said open other end portion transversely to completely isolate the section from the outside atmosphere.

References Cited in the file of this patent

UNITED STATES PATENTS

| | | |
|---|---|---|
| 1,942,162 | Campbell | Jan. 2, 1934 |
| 2,296,553 | Heritage et al. | Sept. 22, 1942 |
| 2,649,101 | Suits | Aug. 18, 1953 |
| 2,679,968 | Richter | June 1, 1954 |
| 2,770,933 | Hakomaki et al. | Nov. 20, 1956 |
| 2,779,066 | Gaugler et al. | Jan. 29, 1957 |
| 2,817,123 | Jacobs | Dec. 24, 1957 |
| 2,805,700 | Klasing et al. | Sept. 10, 1957 |